United States Patent [19]

Toyoda et al.

[11] Patent Number: 5,544,946
[45] Date of Patent: Aug. 13, 1996

[54] MOTORCYCLE BRAKING SYSTEM AND METHOD

[75] Inventors: Hidetoshi Toyoda; Tetsuo Tsuchida; Kanau Iwashita, all of Saitama, Japan

[73] Assignee: Honda Giken Kogyo Kabushiki Kaisha, Tokyo, Japan

[21] Appl. No.: 473,578

[22] Filed: Jun. 7, 1995

[30] Foreign Application Priority Data

Jun. 14, 1994 [JP] Japan .................................. 6-131824

[51] Int. Cl.⁶ .................. B60T 13/00; B60T 8/26
[52] U.S. Cl. ............... 303/9.64; 188/344; 188/106 P; 188/349; 303/9.75; 303/6.01
[58] Field of Search ....................... 188/344, 349, 188/106 P, 345; 303/9.64, 9.62, 9.71, 9.63, 9.61, 8, 6.01, 9.72, 9.74, 9.75; 244/111; 60/567, 581

[56] References Cited

U.S. PATENT DOCUMENTS

| | | | |
|---|---|---|---|
| 3,680,314 | 8/1972 | Toomey | 60/567 |
| 3,839,868 | 10/1974 | Watanabe | 188/344 |
| 4,239,294 | 12/1980 | Burgdorf | 303/9.64 |
| 5,219,211 | 6/1993 | Tsuchida et al. | 303/9.64 |
| 5,273,346 | 12/1993 | Tsuchida et al. | 188/106 P X |
| 5,372,408 | 12/1994 | Tsuchida et al. | 303/9.64 |

FOREIGN PATENT DOCUMENTS

| | | | |
|---|---|---|---|
| 2805033 | 8/1979 | Germany | 188/344 |
| 55140637 | 11/1980 | Japan | 188/344 |
| 471951 | 3/1992 | Japan | 303/9.64 |

OTHER PUBLICATIONS

English abstract of JP 5-319348, Honda Motor Co. Ltd., Dec. 3, 1993, Tsuchida.

*Primary Examiner*—Douglas C. Butler

[57] ABSTRACT

A motorcycle braking system distributing liquid pressure to a first front brake, a second front brake and a rear brake includes a first master cylinder actuated by a front brake lever and a second master cylinder actuated by a back brake pedal. The first master cylinder is connected directly to the first front brake and the second front brake. The brake system also employs a pressure controller that distributes liquid pressure from the first and second master cylinders to the second front brake according to the liquid pressure from the second master cylinder. A secondary master cylinder supplies a secondary liquid pressure to the rear brake in response to actuation of the first front brake. The secondary liquid pressure supplied to the back brake is transformed by a pressure-transformer. Using these components, the braking system implements a braking control method that provides improved control of the motorcycle while braking.

15 Claims, 6 Drawing Sheets

MOTORCYCLE BRAKING SYSTEM AND METHOD

BACKGROUND OF THE INVENTION

1. Field of the Invention

The present invention relates to a brake system for a motorcycle, in which a common master cylinder is connected with front wheel brakes and a rear wheel brake.

2. Description of Background Art

A brake system is already known in, for example, Japanese Patent Laid-Open No. 319348/1993, wherein the master cylinder is connected with the front wheel brake and the rear wheel brake wherein the liquid pressure from the master cylinder acts directly upon the front wheel brake. As a result, the front wheel is excessively braked even if the brake lever is depressed relatively weakly to slow the speed of the motorcycle making it difficult to control the motorcycle while braking.

SUMMARY AND OBJECTS OF THE INVENTION

The present invention has been conceived in view of such background and has for its object to provide a brake system for a motorcycle, which is able to change the distribution of the braking force at the front wheel side between two states in which the output liquid pressure of the master cylinder is relatively low or relatively high.

In order to achieve the above-specified object, according to the present invention, there is provided a brake system for a motorcycle in which a common master cylinder is connected with front wheel brakes and with a rear wheel brake, characterized in that there is mounted on the front wheel a plurality of front wheel brakes wherein one of the front wheel brakes is connected directly with the master cylinder and the other front wheel brake is connected indirectly with the master cylinder through a pressure controller that changes the liquid pressure transmission ratio in accordance with the output liquid pressure of the master cylinder.

In addition, the pressure controller can be switched between a state, in which it intercepts the liquid pressure transmission when the output liquid pressure of the master cylinder is lower than a predetermined level, and a state in which it transmits the liquid pressure when the output liquid pressure of the master cylinder is equal to or higher than the predetermined level.

One of the front wheel brakes is equipped with a secondary master cylinder for establishing a liquid pressure in response to a brake reaction caused by the action of the front wheel brake. The secondary master cylinder is also connected with the rear wheel brake.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
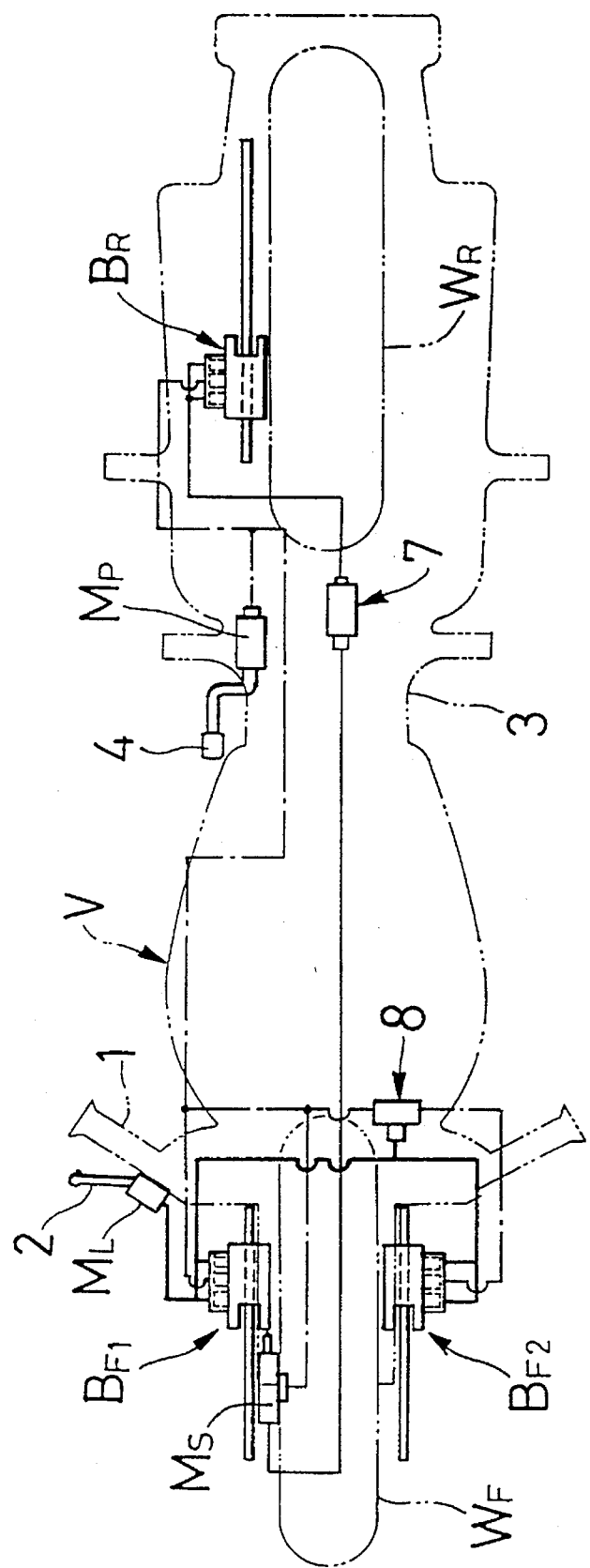
FIG. 1 is a top plan view of a motorcycle equipped with a brake system according to the present invention.
Figure 2:
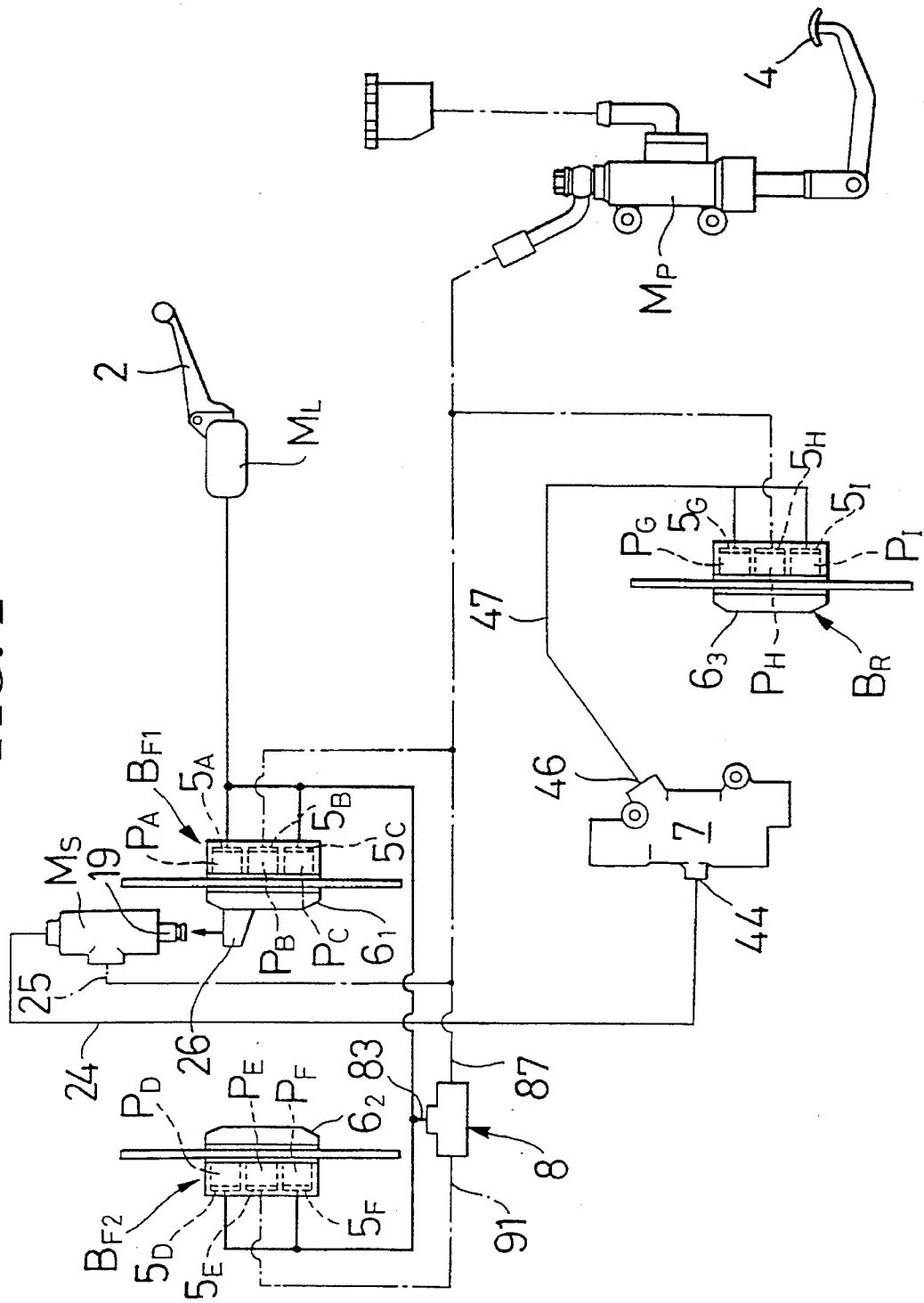
FIG. 2 is a diagram of brake system.

With reference to FIGS. 1 and 2, a first front wheel brake $B_{F1}$ and a second front wheel brake $B_{F2}$ are respectively mounted on the righthand and lefthand sides of the front wheel $W_F$ of a motorcycle V, and a rear wheel brake $B_R$ is mounted on the righthand side of a rear wheel $W_R$.

On the righthand end portion of a steering handle 1 there is mounted a primary master cylinder $M_L$ for outputting a liquid pressure according to the actuation of a brake lever 2. On the longitudinal central portion of a body frame 3, there is mounted a second master cylinder $M_P$ that outputs a liquid pressure according to the depression of a brake pedal 4.

As further described below, when the brake lever 2 is solely actuated while the brake pedal 4 is left unactuated, the first and second front wheel brakes $B_{F1}$ and $B_{F2}$ and the rear wheel brake $B_R$ are operated by the liquid pressure outputted from the primary master cylinder $M_L$. When, on the other hand, the brake pedal 4 is solely actuated while the brake lever 2 is left unactuated, the first front wheel brake $B_{F1}$ and the rear wheel brake $B_R$ are operated. The second front wheel brake $B_{F2}$, however, is not operated when the actuating force of the brake pedal 4 is relatively low but is operated when the actuating force of the brake pedal 4 is relatively high.

The first front wheel brake $B_{F1}$ is a disc brake which is slidably fitted in a caliper $6_1$, with a front piston $P_A$, a central piston $P_B$ and a rear piston $P_C$. Surfaces of the front piston $P_A$, the central piston $P_B$, and the rear piston $P_C$ confront liquid pressure chambers $5_A$, $5_B$ and $5_C$, respectively.

Likewise, the second front wheel brake $B_{F2}$ is a disc brake which is slidably fitted in a caliper $6_2$ with the rear surfaces of its front piston $P_D$, central piston $P_E$ and rear piston $P_F$ confronting liquid pressure chambers $5_D$, $5_E$ and $5_F$, respectively.

The rear wheel brake $B_R$ is a disc brake which is slidably fitted in a caliper $6_3$ with a front piston $P_G$, a central piston $P_H$ and a rear piston $P_I$ that confront liquid pressure chambers $5_G$, $5_H$ and $5_I$, respectively.

The primary master cylinder $M_L$ is connected directly with the liquid pressure chambers $5_A$ and $5_B$ of the first front wheel brake $B_{F1}$ and directly to the liquid pressure chambers $5_D$ and $5_F$ of the second front wheel brake $B_{F2}$. The first front wheel brake $B_{F1}$ is also equipped with a secondary master cylinder $M_s$ for generating a liquid pressure in response to a brake reaction which is generated according to the action of the first front wheel brake $B_{F1}$.

The secondary master cylinder $M_s$ is connected through a pressure-transforming device 7 to the liquid pressure chambers $5_G$ and $5_I$ of the rear wheel brake $B_R$. Furthermore, the second master cylinder $M_P$ is connected directly with the liquid pressure chamber $5_H$ of the rear wheel brake $B_R$ and the liquid pressure chamber $5_B$ of the first front wheel brake $B_{F1}$ and through pressure controller 8 with the liquid pressure chamber $5_E$ of the second front wheel brake $B_{F2}$.

Figure 3:
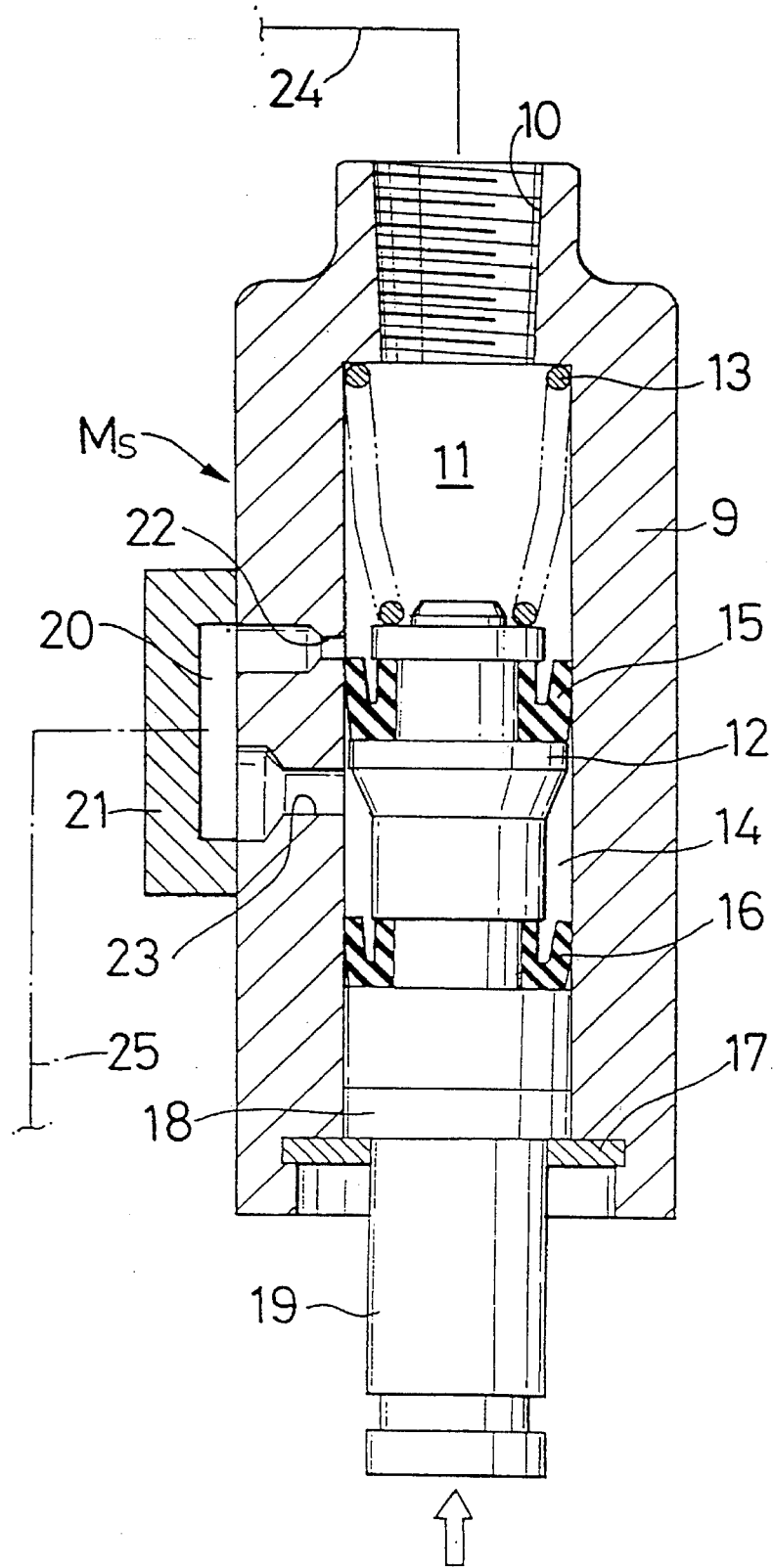
FIG. 3 is a longitudinal section of a secondary master cylinder $M_s$.

With additional reference to FIG. 3, the secondary master cylinder $M_s$ has its cylinder body 9 formed into a cylindrical shape having an output port 10 in its one closed end. In cylinder body 9, there is slidably fitted a piston 12 to define an output liquid pressure chamber 11 leading to the output port 10 and extending between the closed end portion of the cylinder body 9 and one end of the piston 12. In the output liquid pressure chamber 11 between one end of the cylinder body 9 and the piston 12, there is compressed a return spring 13 for urging the piston 12 in the direction that increases the volume of the output liquid pressure chamber 11.

The piston 12 has its intermediate portion radially reduced at its outer circumference to form an annular chamber 14 between itself and the inner circumference of the cylinder body 9. On the outer circumference of the piston 12, there are fitted first and second cup seals 15 and 16 which define the annular chamber 14 therebetween.

The first cup seal 15, located between the annular chamber 14 and the output liquid pressure chamber 11, is in sliding contact with the inner circumference of the cylinder body 9 and permits communication of the working liquid from the annular chamber 14 to the output liquid pressure chamber 11 when the pressure in the output liquid pressure chamber 11 is lower than that in the annular chamber 14. First cup seal 15 obstructs the communication of the working liquid from the output liquid pressure chamber 11 to the annular chamber 14.

The second cup seal 16 is in sliding contact with the inner circumference of the cylinder body 9 to obstruct the communication of the working liquid with the side opposite to the output liquid pressure chamber 11.

In the open end of the cylinder body 9, there is fitted a stop ring 17, by which is slidably fitted a disc-shaped push plate 18 in the cylinder body 9 while being obstructed from coming out. The push plate 18 is in coaxial contact with the other end of the piston 12. From the push plate 18, moreover, there is coaxially and integrally extended a rod 19 which extends away from the piston 12.

On the outer circumference of the cylinder body 9, there is fixed a cover 21 that forms a reserving chamber 20 between cover 21 and the outer circumference of the cylinder body 9. The cylinder body 9 includes a primary port 22 formed in the side wall of the cylinder body 9 for opening the output liquid pressure chamber 11 into the reserving chamber 20 when the piston 12 is in the position that maximizes the volume of the output liquid pressure chamber 11 (as shown in FIG. 3) and a secondary port 23 that allows the annular chamber 14 to communicate with the reserving chamber 20 at all times.

As shown in FIG. 2, the caliper $6_1$ of the first front wheel brake $B_{F1}$ is equipped, with a connection arm 26 which is associated with and connected to the rod 19. By the brake reaction acting upon the caliper $6_1$ when the first front wheel brake $B_{F1}$ is actuated, the connection arm 26 pushes the rod 19 upward so that the piston 12 reduces the volume of the output liquid pressure chamber 11. Thus, the piston 12 reduces the volume of the output liquid pressure chamber 11, even after the first cup seal 15 passes the primary port 22 to intercept the communication between the reserving chamber 20 and the output liquid pressure chamber 11, so that the liquid pressure is outputted from the output liquid pressure chamber 11 via output port 10.

Output port 10 is connected through a conduit 24 with the pressure-transforming device 7. Conduit 25 connects the reserving chamber 20 with the liquid pressure chamber $5_H$ of the rear wheel brake $B_R$, the second master cylinder $M_P$, the central piston $P_B$ of front brake $B_{F1}$, and the central piston $P_E$ of front brake $B_{F2}$ (via pressure controller 8).

Figure 4:
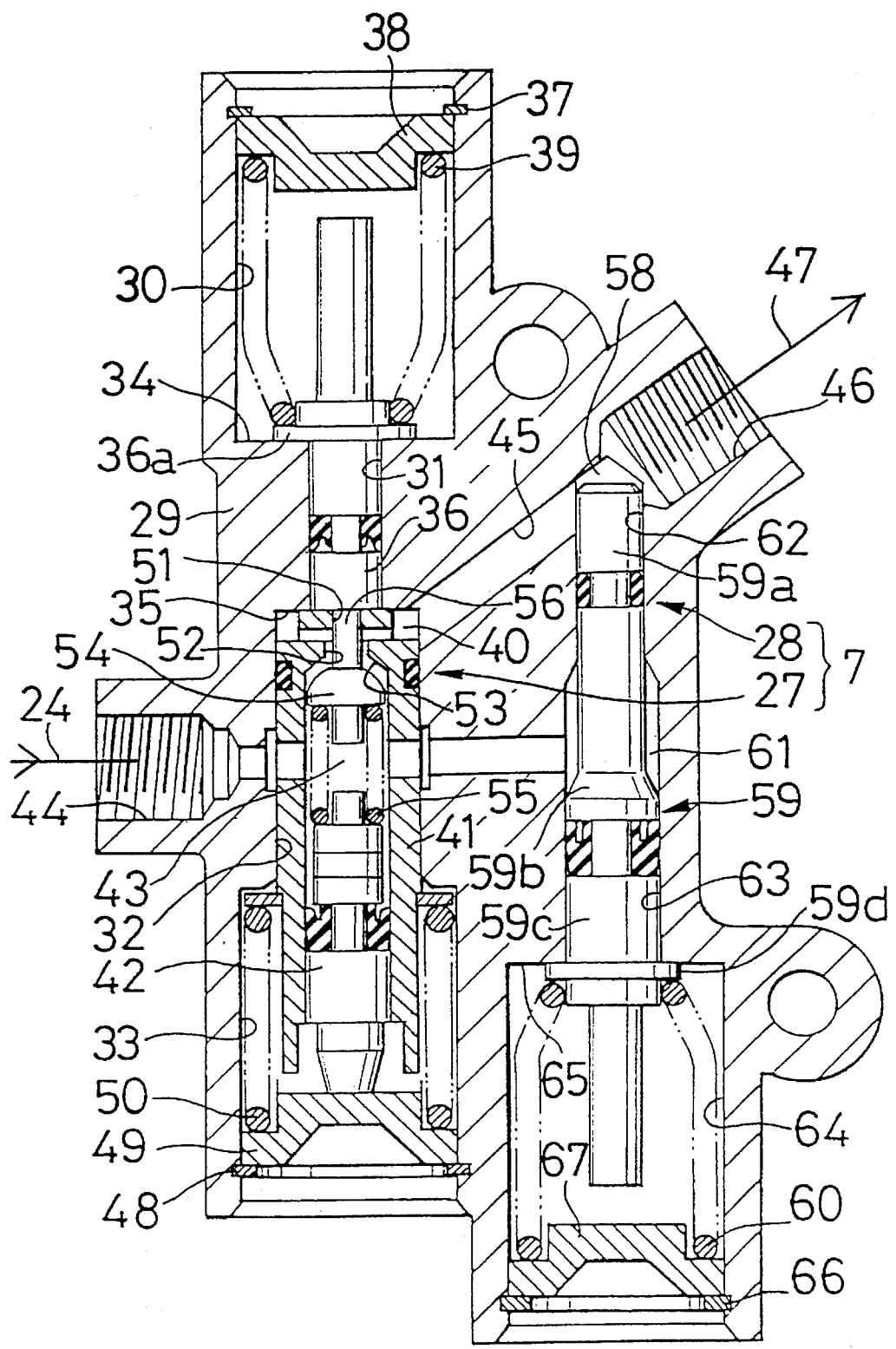
FIG. 4 is a longitudinal section of a pressure-transforming device 7.

As shown in FIG. 4, the pressure-transforming device 7 is equipped with a proportional pressure-reducing valve 27 and pressure-reducing unit 28. The proportional pressure-reducing valve 27 has a housing 29 formed with a first spring housing hole 30 having one end thereof opening into a first sliding hole 31 which is radially reduced from and coaxial to the first spring housing hole 30. A second sliding hole 32, radially enlarged from the first sliding hole 31, has one end coaxially extensive with the first sliding hole 31. A second spring housing hole 33, radially enlarged from the second sliding hole 32, has one end coaxially leading to the second sliding hole 32 and the other end opened.

In the first sliding hole 31, a liquid-tight and slidably-fitted regulation piston 36 is formed at an intermediate portion of the first sliding hole 31 with a flanged portion 36a that abuts against a stepped portion 34 between the first spring housing hole 30 and the first sliding hole 31. A regulation spring 39 is compressed between the flanged portion 36a and a spring receiving member 38 which is supported by a stop ring 37 fitted in the open end portion of the first spring housing hole 30. Thus, the end face of the regulation piston 36 facing the second sliding hole 32 is flush with a stepped portion 35 (that is between the first and second sliding holes 31 and 32) when the flanged portion 36a of regulation piston 36 is in abutment against the stepped portion 34.

In the second sliding hole 32, there is slidably fitted a pressure-receiving piston 41 that forms an output liquid pressure chamber 40 between itself and the stepped portion 35. In the annulus of pressure-receiving piston 41 there is a liquid-tight and relatively slidable spring receiving piston 42 which defines an input liquid pressure chamber 43 between the pressure-receiving piston 41 and the spring receiving piston 42.

Thus, the housing 29 is formed with an input port 44 that receives liquid pressure from the secondary master cylinder $M_s$ via conduit 24. The input port 44 communicates with the input liquid pressure chamber 43. The housing 29 also includes an output port 46 which communicates with the output liquid pressure chamber 40 via a liquid pressure passage 45. A conduit 47 connects the output port 46 with the liquid pressure chambers $5_G$ and $5_I$ of the rear wheel brake $B_R$ as shown in FIG. 2.

In the open end portion of the second spring housing hole 33, a stop ring 48 is fitted. This stop ring 48 supports a spring receiving member 49 that abuts the end portion of the spring receiving piston 42 at the side opposite to the input liquid pressure chamber 43. A pressure-regulating spring 50 is compressed between the spring receiving member 49 and the pressure-receiving piston 41. Moreover, the pressure-receiving piston 41 is made axially shorter than the distance between the stepped portion 35 and the spring receiving member 49 so that the pressure-receiving piston 41 can axially reciprocate between the stepped portion 35 and the spring receiving member 49.

The end portion of the pressure-receiving piston 41 at the side of the output liquid pressure chamber 40 is axially formed with a guide hole 51 and a valve hole 52 leading to the output liquid pressure chamber 40 and also includes a tapered valve seat 53 with the valve hole 52 opened at its central portion to face the input liquid pressure chamber 43. In the input liquid pressure chamber 43, there is housed a valve body 54 which can be seated on the valve seat 53. A closing spring 55 is compressed between the valve body 54 and the spring receiving piston 42 to urge seating of valve body 54 on valve seat 53. From the valve body 54 there is an integral valve opening rod 56 which protrudes from valve body 54 and which is loosely fitted in the valve hole 52 and slidably fitted in the guide hole 51. The valve opening rod 56 is in abutment against the regulation piston 36.

The pressure-reducing unit 28 shares the housing 29 with the proportional pressure-reducing valve 27 and is equipped with a stepped pressure-reducing piston 59 which is slidably fitted in the housing 29 and has one end facing a liquid chamber 58 formed midway in the liquid pressure passage 45 that joins the output liquid pressure chamber 40 of the proportional pressure-reducing valve 27 with the output port 46. Spring 60 urges the pressure-reducing piston 59 so as to reduce the volume of the liquid chamber 58. Between the outer circumference of an intermediate portion of the pressure reducing piston 59 and the housing 29, there is formed an annular liquid pressure chamber 61 for applying the liquid pressure so as to increase the volume of the liquid chamber 58.

The housing 29 is formed with a smaller-diameter sliding hole 62 having one end thereof leading to the liquid chamber 58; a larger-diameter sliding hole 63 radially enlarged with respect to the smaller-diameter sliding hole 62 and having one end thereof coaxially leading to the other end of the smaller-diameter sliding hole 62; and a third spring housing hole 64 radially enlarged with respect to the larger-diameter sliding hole 63 and having one end thereof coaxially leading to the other end of the larger-diameter sliding hole 62 and the other end thereof opened.

The pressure-reducing piston 59 is formed with a smaller-diameter portion 59a which is liquid-tight and slidably fitted in the smaller-diameter sliding hole 62 having its one end facing the liquid chamber 58 and a larger-diameter portion 59c which is liquid-tight and slidably fitted in the larger-diameter sliding hole 63 and which is coaxially extensive with a tapered, pressure-receiving stepped portion 59b and the smaller-diameter portion 59a.

The annular liquid pressure chamber 61 is formed in the annulus that is between the smaller-diameter sliding hole 62, the larger-diameter sliding hole 63, and the pressure-receiving stepped portion 59b of the pressure-reducing piston 59. Furthermore, the annular liquid pressure chamber 61 extends so as to communicate with the input port 44.

The pressure-reducing piston 59 includes a flanged portion 59d which can abut against a stepped portion 65 that is between the larger-diameter sliding hole 63 and the third spring housing hole 64. The spring 60 is compressed between the flanged portion 59d and a spring receiving member 67 which is supported by a stop ring 66 fitted in the open end portion of the third spring housing hole 64.

Figure 5:
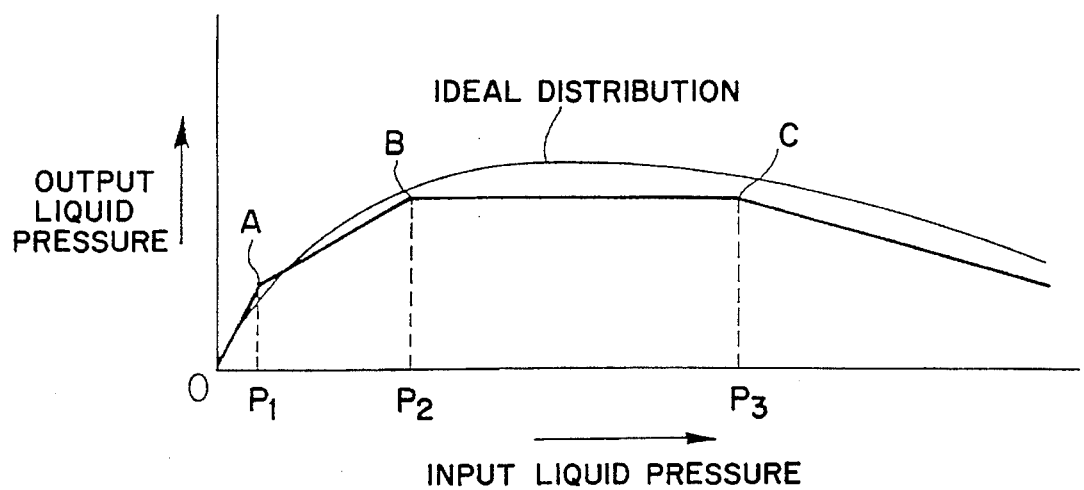
FIG. 5 is a graph of the pressure-reducing characteristics of the pressure-transforming device 7.

The pressure-transforming device 7 thus constructed has pressure-transforming characteristics, as illustrated in FIG. 5. Specifically, the proportional pressure-reducing valve 27 is left open before the liquid pressure inputted to the input port 24 reaches level P1, so that the output liquid pressure from the output port 46 increases in proportion to the input liquid pressure, as indicated by a straight line joining point 0 and point A.

When the input liquid pressure exceeds the level P1, the pressure in the output liquid pressure chamber 40 causes pressure-receiving piston 41 to move against the spring force of the pressure-regulating spring 50 so that the valve body 54 seats on the valve seat 53 to intercept the communication between the input liquid pressure chamber 43 and the output liquid pressure chamber 40. This movement of pressure receiving piston also increases the volume of the output liquid pressure chamber 40.

As the liquid pressure of the input liquid pressure chamber 43 further rises, the pressure-receiving piston 41 moves so that the valve body 54 leaves the valve seat 53 to restore the communication between the input liquid pressure chamber 43 and the output liquid pressure chamber 40. This movement of pressure-receiving piston 41 also reduces the volume of the output liquid pressure chamber 40. Thus, the pressure-receiving piston 41 axially reciprocates according to the rise of the input liquid pressure to open and close the valve hole 52 interruptedly, so that the rising rate of the output liquid pressure decreases, as indicated by a straight line joining point A and point B in FIG. 5.

When the input liquid pressure further rises to level $P_2$, the liquid pressure acting upon the regulation piston 36 overcomes the spring force of the compressed regulation spring 39 so that the regulation piston 36 moves to further compress the regulation spring 39. As a result, the valve opening rod 56 of the valve body 54 (urged by the closing spring 55) follows the axial movement of the regulation piston 36 so that the valve body 54 is seated upon the valve seat 53 to intercept the communication between the input liquid pressure chamber 43 and the output liquid pressure chamber 40. As a result, when the input liquid pressure reaches the level $P_2$, the output liquid pressure is held at a constant level, as indicated by a straight line jointing point B and point C in FIG. 5.

When the input liquid pressure further rises to exceed level $P_3$, the liquid pressure acting on the pressure-reducing piston 59 overcomes the spring force of the spring 60, and the pressure-reducing piston 59 moves so as to increase the volume of the liquid chamber 58 and thereby decrease the output liquid pressure.

Thus, the characteristics of distributing the braking pressure between the front and rear wheels close to the ideal characteristics represented by the ideal distribution curve of FIG. 5 can be achieved by the pressure-transforming device 7.

Figure 6:
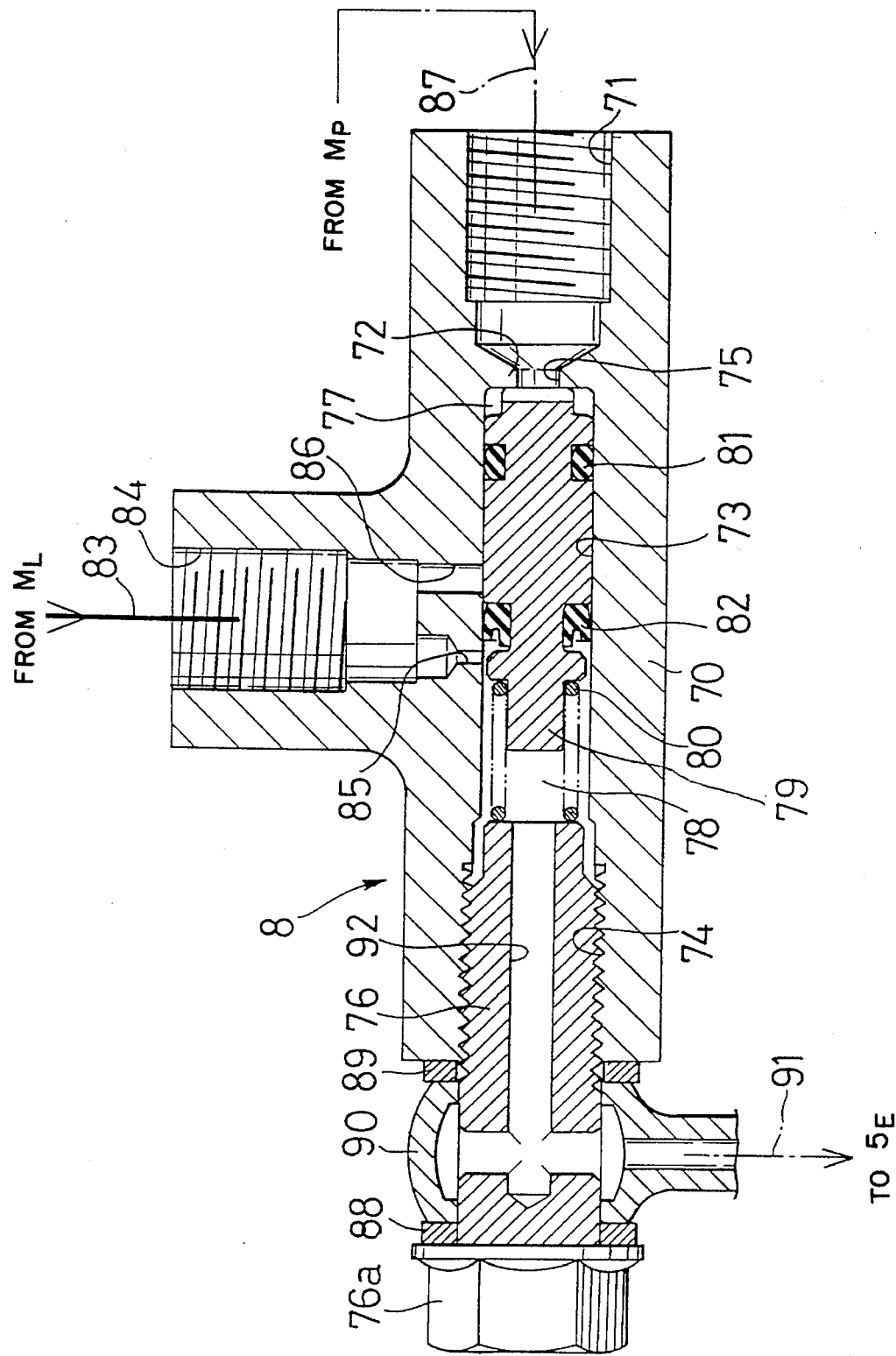
FIG. 6 is a longitudinal section of a pressure controller 8.

As shown in FIG. 6, the pressure controller 8 has a housing 70 that includes an input port 71, a cylinder hole 73, a partition 72 interposed between the cylinder hole 73 and the input port 71, and a threaded hole 74 all of which are coaxially formed in the recited order. The partition 72 includes a communication hole 75 coaxially joining the input port 71 and the cylinder hole 73. A bolt 76 is driven into the threaded hole 74.

In the cylinder hole 73, there is slidably fitted a piston 79 which defines not only an input liquid pressure chamber 77 leading through the communication hole 75 to the input port 71 between piston 79 and partition 72 but also an output liquid pressure chamber 78 between piston 79 and bolt 76. Moreover, a spring 80 is compressed in the output liquid pressure chamber 78 between the bolt 76 and the piston 79 that urges piston 79 towards the input liquid pressure chamber 77.

Mounted on the outer circumference of the piston 79, there is an O-ring 81 on the end facing the input liquid pressure chamber 77 and a cup seal 82 on the end facing the output liquid pressure chamber 78. O-ring 81 and cup seal 82 are spaced apart from each other in the axial direction of the piston 79. The cup seal 82 is mounted on the piston 79 such that the working liquid between the cup seal 82 and the O-ring 81 is allowed to flow to the output liquid pressure chamber 78 in response to the drop of liquid pressure in the output liquid pressure chamber 78.

The housing 70 is provided with a connection hole 84 in a side portion thereof to which is connected a conduit 83 leading from the primary master cylinder $M_L$ which outputs liquid pressure in response to the actuation of the brake lever 2. A primary port 85 and a secondary port 86 lead to the connection hole 84 and open in the inner face of the cylinder hole 73. When the piston 79 is positioned to minimize the volume of the input liquid pressure chamber 77, (as shown in FIG. 6), the primary port 85 opens in the inner face of the cylinder hole 73 to connect the output liquid pressure chamber 78 with conduit 83. The secondary port 86 is positioned between the Oring 81 and the cup seal 82 and opens in the inner face of the cylinder hole 73 independent of the axial position of the piston 79.

To the input port 71, there is connected a conduit 87 from the second master cylinder $M_p$ which outputs liquid pressure to input port 71 in response to the actuation of the brake pedal 4.

Between a head 76a of the bolt 76 and the cylinder body 70 there is clamped a hose mouth piece 90. Washer 88 is interposed between hose mouthpiece 90 and head 76a. Washer 89 is interposed between hose mouthpiece 90 and cylinder body 70. A hole 91 leading to the hose mouthpiece 90 communicates with the output liquid pressure chamber 78 via a communication passage 92 formed in the bolt 76 and is connected with the liquid pressure chamber $5_E$ of the second front wheel brake $B_{F2}$, as shown in FIG. 2.

The ratio of the liquid pressure transmission by the pressure controller 8 is varied with the output liquid pressure of the second master cylinder $M_p$. Specifically, when the liquid pressure that urges the piston 79 so as to increase the volume of the input liquid pressure chamber 77 is lower than the opposing spring force of spring 80, the connection hole 84 communicates with the output liquid pressure chamber 78. In this state, the liquid pressure transmission between the second master cylinder $M_p$ and the liquid pressure chamber $5_E$ of the second front wheel brake $B_{F2}$ is intercepted. Also in this state, the first master cylinder $M_L$ communicates with the liquid pressure chamber $5_E$ of the second front wheel brake $B_{F2}$.

When the liquid pressure of the input liquid pressure chamber 77 exceeds a predetermined level so that the liquid pressure that urges the piston 79 so as to increase the volume of the input liquid pressure chamber 77 overcomes the opposing spring force of spring 80, the piston 79 moves to increase the volume of the input liquid pressure chamber 77 and reduce the volume of the output liquid pressure chamber 78. The liquid pressure that is outputted from the output liquid pressure chamber 78 is in accordance with the reduction of the volume of the output liquid pressure chamber 78. In short, when the liquid pressure of the input liquid pressure chamber 77 exceeds the predetermined level that overcomes spring 80, the output liquid pressure of the second master cylinder $M_p$ is transmitted via piston 79 to the liquid pressure chamber $5_E$ of the second front wheel brake $B_{F2}$.

Next, the operation of this embodiment will be described.

When the brake lever 2 is solely actuated, the liquid pressure generated in the primary master cylinder $M_L$ is applied directly to the liquid pressure chambers $5_A$ and $5_C$ of the first front wheel brake $B_{F1}$ and the liquid pressure chambers $5_D$ and $5_F$ of the second front wheel brake $B_{F2}$ and further to the liquid pressure chamber $5_E$ of the second front wheel brake $B_{F2}$, because the connection hole 84 and the output liquid pressure chamber 78 are held in communication with each other by the pressure controller 8.

Moreover, the liquid pressure established in the secondary master cylinder $M_s$ in accordance with the braking action of the first front wheel brake $B_{F1}$ acts upon the liquid pressure chambers $5_G$ and $5_I$ of the rear wheel brake $B_R$ through the pressure-transforming device 7 to brake the rear wheel $W_R$. At this time, the output liquid pressure of the secondary master cylinder $M_s$ rises with the increase in the braking force of the front wheel $W_F$, the braking force close to the ideal distribution characteristic is established in the rear wheel $W_R$ by the pressure-transforming characteristics of the pressure-transformer 7, as shown in FIG. 5.

When the brake pedal 4 is solely actuated, on the other hand, the liquid pressure generated in the second master cylinder $M_p$ acts directly upon the liquid pressure chamber $5_H$ of the rear wheel brake $B_R$ and the liquid pressure chamber $5_B$ of the first front wheel brake $B_{F1}$. Furthermore, the braking action of the first front wheel brake $B_{F1}$ causes liquid pressure to be generated in the secondary master cylinder $M_s$ which acts indirectly on the liquid pressure chambers $5_G$ and $5_I$ of the rear wheel brake $B_R$ through the pressure-transformer 7. Thus, the front wheel $W_F$ and the rear wheel $W_R$ are braked.

Incidentally, when the liquid pressure from the second master cylinder $M_p$ is lower than a predetermined level, the liquid pressure is not transmitted to the liquid pressure chamber $5_E$ of the second front wheel brake $B_{F2}$ because of the action of the pressure controller 8 so that the second front wheel brake $B_{F2}$ is left unactuated.

When the liquid pressure from the second master cylinder $M_p$ exceeds the predetermined level, on the contrary, the pressure controller 8 transmits the liquid pressure to the liquid pressure chamber $5_E$ of the second front wheel brake $B_{F2}$ to actuate the second front wheel brake $B_{F2}$. Specifically, when the depression of the brake pedal 4 is less than a predetermined value, the first front wheel brake $B_{F1}$ is actuated, but the second front wheel brake $B_{F2}$ does not actuate. When the depression of the brake pedal 4 exceeds the predetermined value, both the first and second front wheel brakes $B_{F1}$ and $B_{F2}$ actuate. As a result, if the brake pedal 4 is relatively weakly depressed to adjust the running speed of the motorcycle V, the front wheel $W_F$ is not excessively braked.

If the brake pedal 4 is relatively intensely depressed to raise the output liquid pressure of the second master cylinder $M_p$ to a relatively high level, the braking force of the front wheel $W_F$ can be set to a relatively high value by the actuation of both front wheel brakes $B_{F1}$ and $B_{F2}$.

Moreover, when the brake lever 2 and the brake pedal 4 are simultaneously actuated, all the brakes $B_{F1}$, $B_{F2}$ and $B_R$ are actuated to brake the front wheel $W_F$ and the rear wheel $W_R$.

Now, let it be assumed that the brake pedal 4 is depressed while the brake lever 2 is braking. In the pressure controller 8, the piston 79 is initially in the state that minimizes the volume of the input liquid pressure chamber 77. Piston 79 stays in this initial state until the pressure from the master cylinder $M_p$ overcomes the sum of the liquid pressure in the output liquid pressure chamber 78 from the first master cylinder $M_L$ and the spring force of the spring 80. After the output liquid pressure of the second master cylinder $M_p$ rises so that the piston 79 moves to close the primary port 85, the pressure controller 8 is brought into the state in which it transmits the liquid pressure from the second master cylinder $M_p$ to the liquid pressure chamber $5_E$ of the second front wheel brake $B_{F2}$.

When the brake lever 2 is actuated while the brake pedal 4 is being depressed sufficiently hard so as to cause piston 79 to block primary port 85, on the other hand, the output liquid pressure of the first master cylinder $M_L$ is applied to the output liquid pressure chamber 78 by the action of the cup seal 82 when the output liquid pressure of the first master cylinder $M_L$ is higher than the liquid pressure of the output liquid pressure chamber 78. As a result, output liquid pressure of the first master cylinder $M_L$ urges the piston 79 in the direction that reduces the volume of the input liquid pressure chamber 77. Also, the output liquid pressure of the second master cylinder $M_p$ urges the piston 79 so as to increase the volume of the input liquid pressure chamber 77, so that the output liquid pressure of the first master cylinder $M_L$ acts upon the liquid pressure chamber $5_E$ of the second front wheel brake $B_{F2}$ after the piston 79 is moved so as to reduce the volume of the input liquid pressure chamber 77 and thereby open the primary port 85 by the rise of the output liquid pressure of the first master cylinder $M_L$.

As has been described hereinbefore, there is mounted on the front wheel a plurality of front wheel brakes of which the front wheel brake is connected directly with the master cylinder. The other front wheel brake is connected with the master cylinder through a pressure controller that changes a liquid pressure transmission ratio in accordance with the output liquid pressure of the master cylinder. As a result, the front wheel braking force distribution can be changed according to the output liquid pressure from the master cylinder.

In addition, the pressure controller can be switched between a state, in which it intercepts the liquid pressure transmission when the output liquid pressure of the master cylinder is lower than a predetermined level, and a state in which it transmits the liquid pressure when the output liquid pressure of the master cylinder is equal to or higher than the predetermined level. As a result, a necessary braking force can be obtained by rendering the other front wheel brake unactuated to thereby weaken the front wheel braking force, when the output liquid pressure of the master cylinder is relatively low and by actuating all the front wheel brakes when the output liquid pressure of the master cylinder is relatively high.

Furthermore, one of the front wheel brakes is equipped with a secondary master cylinder for establishing a liquid pressure by a brake reaction that is generated in response to the action of the front wheel brake. The secondary master cylinder is connected with the rear wheel brake through a pressure transforming device. As a result, the rear wheel brake can be associatively actuated in response to the braking action of the front wheel brakes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A brake system for a motorcycle having a first master cylinder and a second master cylinder comprising:

a first front wheel brake connected directly with the first master cylinder;

a second front wheel brake having a first piston connected directly to the first master cylinder and a second piston connected indirectly with the first master cylinder;

a pressure controller connecting the first and second master cylinders to the second piston of said second front wheel brake, said pressure controller changing a liquid pressure transmission ratio supplied to the second piston of said second front wheel brake by the first and second master cylinders in accordance with an output liquid pressure of the second master cylinder to selectively provide the output liquid pressure from the second master cylinder to the second piston of said second front wheel brake.

2. The brake system according to claim 1, wherein said liquid pressure controller is switchable between a first state and a second state:

wherein said liquid pressure controller is in the first state when the output liquid pressure of the second master cylinder is lower than a predetermined level, in the first state said liquid pressure controller intercepts a liquid pressure transmission from the second master cylinder to said second piston of said second front wheel brake and provides liquid pressure from the first master cylinder to said second piston of said second front wheel brake, and wherein said liquid pressure controller is in the second state when the output liquid pressure of the second master cylinder is equal to or higher than the predetermined level, in the second state said liquid pressure controller transmits the liquid pressure from the second master cylinder to said second piston of said second front wheel brake.

3. The brake system according to claim 1, wherein said first front wheel brake includes a secondary master cylinder establishing a liquid pressure in response to a brake reaction caused by action of said first front wheel brake and wherein said secondary master cylinder is connected with a rear wheel brake.

4. The brake system according to claim 3 further comprising:

a liquid pressure transformer receiving input liquid pressure from said secondary master cylinder and supplying a transformed output liquid pressure to the rear wheel brake.

5. The brake system according to claim 4 wherein said liquid pressure transformer includes a proportional liquid pressure valve having:

a first liquid pressure transmission ratio when the input liquid pressure is between zero and a first predetermined value, a second liquid pressure transmission ratio when the input liquid pressure is between the first predetermined value and a second predetermined value, and a substantially constant output liquid pressure when the input liquid pressure is between the second predetermined value and a third predetermined value.

6. The brake system according to claim 5 wherein said liquid pressure transformer further comprises:

a liquid pressure reducer reducing the output liquid pressure when the input liquid pressure exceeds the third predetermined value.

7. A brake control system for a motorcycle having a first front brake; a second front brake; a first master cylinder establishing a first output liquid pressure that is supplied to the first front brake and a rear brake; and a second master cylinder establishing a second output liquid pressure that is supplied to the first front brake and the rear brake, comprising:

a liquid pressure controller controlling the first and second output liquid pressures from the first master cylinder and from the second master cylinder and supplying a controlled liquid pressure to the second front brake to selectively provide the second output liquid pressure from the second master cylinder to the second front wheel brake, a secondary master cylinder establishing a secondary liquid pressure in response to the actuation of the first front brake, and a liquid pressure transformer transforming the secondary liquid pressure received from said secondary master cylinder and supplying a transformed liquid pressure to the rear brake.

8. The brake system according to claim 7 wherein said liquid pressure transformer includes a proportional liquid pressure valve having:

a first liquid pressure transmission ratio when the input liquid pressure is between zero and a first predetermined value, a second liquid pressure transmission ratio when the input liquid pressure is between the first predetermined value and a second predetermined value, and a substantially constant output liquid pressure when the input liquid pressure is between the second predetermined value and a third predetermined value.

9. The brake system according to claim 8 wherein said liquid pressure transformer further includes:

a liquid pressure reducer reducing the output liquid pressure when the input liquid pressure exceeds the third predetermined value.

10. The brake system according to claim 8 wherein said proportional liquid pressure valve further comprises:

an annular liquid pressure receiving piston disposed within a first sliding hole and having an axial length less than the axial length of the sliding hole to allow reciprocating motion within the sliding hole;

an inner piston slidably fitted within said annular liquid pressure receiving piston;

an input liquid pressure chamber disposed within said annular liquid pressure receiving piston receiving secondary liquid pressure from said secondary master cylinder;

a valve seat connected to said annular liquid pressure receiving piston separating said input liquid pressure chamber from an output liquid pressure chamber wherein said output liquid pressure chamber is disposed within the sliding hole;

a valve body having an integral valve opening rod axially projecting therefrom that extends across said output liquid pressure chamber;

a regulating piston abutting the integral valve opening rod of said valve body;

a valve body spring urging the integral valve opening rod of said valve body against said regulating piston;

wherein when the input liquid pressure is between zero and the first predetermined liquid pressure value the input liquid pressure is allowed to communicate through said valve seat to said output liquid pressure chamber;

wherein when the input liquid pressure is between the first and second predetermined liquid pressure values said annular liquid pressure receiving piston repeatedly reciprocates between a first position in which the input liquid pressure is allowed to communicate through said valve seat to said output liquid pressure chamber and a second position in which said valve seat of said annular liquid pressure receiving chamber makes a substantial seal with said valve body to block communication between the input liquid pressure chamber and the output liquid pressure chamber; and wherein when the input liquid pressure is between the second and third liquid pressure values said regulating piston moves to allow said valve body spring to seat said valve body on said valve seat to block communication between the input liquid pressure chamber and the output liquid pressure chamber such that the output liquid pressure is held substantially constant.

11. The brake system according to claim 7 wherein said liquid pressure controller is switchable between a first state and a second state:

wherein said liquid pressure controller is in the first state when the output liquid pressure of the second master cylinder is lower than a predetermined level, in the first state said liquid pressure controller intercepts a liquid pressure transmission from the second master cylinder to said second piston of said second front wheel brake and provides liquid pressure from the first master cylinder to said second piston of said second front wheel brake, and wherein said liquid pressure controller is in the second state when the output liquid pressure of the second master cylinder is equal to or higher than the predetermined level, in the second state said liquid pressure controller transmits the liquid pressure from the second master cylinder to said second piston of said second front wheel brake.

12. A method of distributing brake fluid pressure between a first front brake, a second front brake and a rear brake of a motorcycle in response to actuation of a front brake actuator or a rear brake actuator comprising the steps of:

applying fluid pressure from a first master cylinder to the first front brake and the second front brake when the front brake actuator is actuated;

applying fluid pressure from a second master cylinder to the rear brake and the first front brake when the rear brake actuator is actuated;

controlling fluid pressures from the first and second master cylinders to the second front brake according to the fluid pressure from the second master cylinder when either the rear or front brake actuators are actuated such that when the fluid pressure from the second master cylinder is lower than a predetermined level, the fluid pressure from the second master cylinder to the second front brake is blocked and the second front brake receives fluid pressure only from the first master cylinder and when the fluid pressure from the second master cylinder is equal to or higher than the predetermined level, the fluid pressure from the second master cylinder to the second front brake is transmitted and the second front brake receives fluid pressure from the second master cylinder.

13. The method of claim 12 further comprising the steps of:

establishing a secondary liquid pressure with a secondary master cylinder when the first front brake is actuated, and applying the secondary liquid pressure to the rear brake.

14. The method of claim 13 further comprising the step of transforming the secondary liquid pressure applied to the rear brake.

15. The method of claim 14, said transforming step having:

a first liquid pressure transmission ratio when the secondary liquid pressure is between zero and a first predetermined value, a second liquid pressure transmission ration when the secondary liquid pressure is between the first predetermined value and a second predetermined value, and a substantially constant output liquid pressure when the secondary liquid pressure is between the second predetermined value and a third predetermined value.

* * * * *